(12) United States Patent
Nilsen et al.

(10) Patent No.: US 6,529,144 B1
(45) Date of Patent: Mar. 4, 2003

(54) METHOD AND APPARATUS FOR MOTION ACTIVATED CONTROL OF AN ELECTRONIC DEVICE

(75) Inventors: Robert W. Nilsen, Fort Worth, TX (US); Jheroen P. Dorenbosch, Paradise, TX (US)

(73) Assignee: Motorola Inc., Schaumburg, IL (US)

( * ) Notice: Subject to any disclaimer, the term of this patent is extended or adjusted under 35 U.S.C. 154(b) by 4 days.

(21) Appl. No.: 09/667,341

(22) Filed: Sep. 22, 2000

(51) Int. Cl.[7] .............................................. H03M 11/00
(52) U.S. Cl. ........................... 341/20; 341/21; 345/158; 340/568.1; 340/568.7
(58) Field of Search ................... 341/20, 21; 340/568.1, 340/568.7; 446/81; 345/158

(56) References Cited

U.S. PATENT DOCUMENTS

| | | | | |
|---|---|---|---|---|
| 4,196,429 A | * | 4/1980 | Davis | 340/571 |
| 4,337,462 A | * | 6/1982 | Lemelson | 340/568.1 |
| 4,584,569 A | * | 4/1986 | Lopez | 340/566 |
| 5,317,304 A | * | 5/1994 | Choi | 340/568.7 |
| 5,363,120 A | * | 11/1994 | Drumm | 345/158 |
| 5,406,261 A | * | 4/1995 | Glenn | 340/568.1 |
| 5,758,267 A | * | 5/1998 | Pinder et al. | 341/20 |
| 5,819,206 A | * | 10/1998 | Horton et al. | 702/150 |
| 5,898,421 A | * | 4/1999 | Quinn | 345/156 |
| 5,971,827 A | * | 10/1999 | Lee et al. | 466/81 |
| 5,981,884 A | * | 11/1999 | Sato et al. | 178/19.01 |
| 6,115,028 A | * | 9/2000 | Balakrishnan et al. | 345/157 |
| 6,133,830 A | * | 10/2000 | D'Angelo | 340/572.1 |
| 6,172,607 B1 | * | 1/2001 | McDonald | 340/571 |
| 6,177,869 B1 | * | 1/2001 | McDaid | 340/568.1 |
| 6,294,995 B1 | * | 9/2001 | Patterson | 340/571 |

* cited by examiner

*Primary Examiner*—Michael Horabik
*Assistant Examiner*—Albert K. Wong
(74) *Attorney, Agent, or Firm*—Charles W. Bethards; R. Louis Breeden; Matthew C. Loppnow

(57) ABSTRACT

A method and apparatus provides for motion activated control of an electronic device. The method activates a function, such as a backlight feature, of an electronic device, by storing at least one motion sequence and a function corresponding to each motion sequence. Motion of the electronic device is monitored, and when it is determined that the monitored motion corresponds to a motion sequence, the stored function that corresponds to the stored motion sequence is activated. The apparatus has a motion transducer that senses motion of the electronic device, and a device controller in communication with the motion transducer that activates the corresponding function when a motion processor determines that the stored motion sequence has been sensed by the motion transducer.

19 Claims, 2 Drawing Sheets

METHOD AND APPARATUS FOR MOTION
ACTIVATED CONTROL OF AN
ELECTRONIC DEVICE

FIELD OF THE INVENTION

In general, the present invention relates to the field of control of electronic devices, and more particularly to a method and apparatus for activating a function of an electronic device.

BACKGROUND OF THE INVENTION

Devices for inputting information and/or commands into electronic devices are well known. For example, handheld electronic devices such as personal digital assistants, pagers, and cellular telephones typically employ a series of keys or buttons for the operator to press in order to activate a function of the device or input information to the device. A disadvantage of this arrangement is in many instances the operator must be able to see (or at least feel) the buttons to determine which button should be pressed. Moreover, the operator must have the device in a proper handheld position so that the operator can manipulate the keys. In addition, some electronic devices have removable covers or a closable configuration in which the operator cannot access the desired keys without removing the cover or opening the device.

One example of an electronic device function to be activated is a backlight for illumination of the display and/or keys. If a separate button is added to activate the backlight, this incurs the disadvantage of an additional button that occupies valuable space on the device. The user must memorize the location of the button to be able to find it in a low-light environment. Other ways of activating a backlight, such as using a press-and-hold function of an existing key, can be difficult for the user to find and cumbersome to activate. One solution to this problem has been to activate a backlight whenever any keys are pressed. However, since the first button to be pressed is not lit when pressed, the operator runs the risk of pressing an undesirable button. Further, in situations where the backlight remains on for only a predetermined period of time after being activated, it is cumbersome for the user to find an appropriate button to restart the backlight sequence without activating an undesired function. Accordingly, there exists a need to conveniently activate a function or enter information into electronic devices.

DETAILED DESCRIPTION OF THE PREFERRED EMBODIMENT

Figure 1:
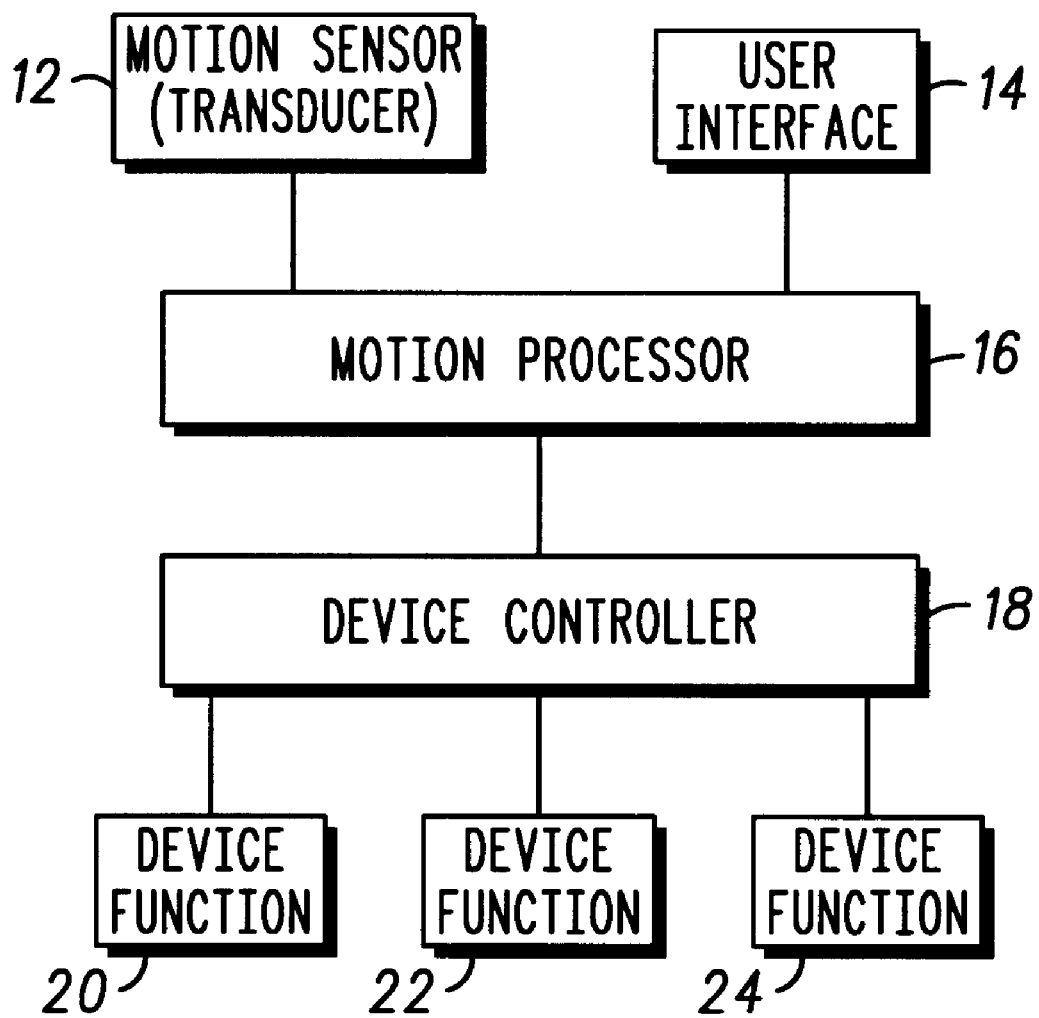
FIG. 1 is a schematic block diagram illustrating an apparatus for motion activated control of an electronic device according to a preferred embodiment of the invention.

The present disclosure relates to an apparatus and method for motion activated control of an electronic device.

In one exemplary embodiment, a method for activating a function of an electronic device involves storing at least one motion sequence and a function corresponding to each motion sequence and monitoring motion of the electronic device. It is determined when the monitored motion corresponds to a stored motion sequence, and the stored function (that corresponds to the stored motion sequence) is activated when it is determined that the monitored motion corresponds to the stored motion sequence.

Another aspect of an embodiment of the method pertains to selecting a function via a user interface and designating a motion sequence to correspond to the selected function.

Another aspect of an exemplary embodiment of the method relates detecting and storing a motion sequence performed by the user to correspond to a selected function.

Another exemplary embodiment, pertains to an apparatus for activating a function of an electronic device. A motion transducer senses motion of the electronic device. A processor, in communication with the motion transducer, has a memory that stores at least one motion sequence and a corresponding function of the electronic device and determines when a stored motion sequence has been sensed by the motion transducer. A device controller, in communication with the motion processor, activates the corresponding function when motion processor determines that the stored motion sequence has been sensed by the motion transducer.

According to a more detailed feature of a preferred embodiment of the apparatus, the transducer may have an accelerometer, a gyroscope and/or an attitude sensor.

According to yet another more detailed feature of a preferred embodiment of the apparatus, the motion transducer and motion processor can be contained in the electronic device.

Also, according to another more detailed feature of a preferred embodiment of the apparatus, the motion transducer can be remote from the electronic device.

In a more detailed aspect of a preferred embodiment of the apparatus, the motion processor is integrated with the device controller.

In a more detailed aspect, preferred embodiments of the method and apparatus provide for determining whether a performed motion sequence differs from an already stored motion sequence and/or a stored environmental motion sequence by less than a predetermined amount. Also, determined can be whether a performed motion differs from environmental or ambient motion sequence. For example, an ambient sequence related to day-to-day operational use of the device by a predetermined amount, thereby avoiding inadvertent activation of a function.

According to one of the more detailed features of a preferred embodiment of the method and apparatus, the activation of the feature can be selectively enabled and/or disabled.

According to another more detailed feature of the method and apparatus, the function that activates is a backlight of the electronic device.

Referring to FIG. 1, a device according to an embodiment in accordance with the present invention is shown embodied in an electronic device 10. The device may be applied to electronic devices 10. For example, handheld personal digital assistants, pagers, cellular telephones, other wireless telephones, portable data devices, and remote controllers for electronic devices and any other suitable devices, which commands and/or information are to be entered.

The present invention includes a motion sensor 12, which may be, for example, any suitable motion transducer such as a one-axis, two-axis, or three-axis accelerometer, a gyroscope, and/or an attitude sensor as are known. The electronic device may also include a user interface 14 that the user can select certain functions to be "taught" corresponding motions. A motion processor 16 stores motion sequences (which may be pre-programmed or which may be taught by the user) that correspond to certain device functions. The motion processor 16 monitors the motion of the device, and when the motion processor 16 detects that a motion sequence has occurred that corresponds to a function, the motion processor 16 then instructs a device controller 18 of the electronic device 10 to perform the corresponding device function, such as one of device functions 20, 22 or 24. The motion processor 16 may include circuitry to send an interrupt to the device controller 18 to indicate the device function to be performed and/or the motion processor 16 may include software that sends appropriate signals to the device controller 18.

Although items 16 and 18 are shown separately, they may be incorporated together in a single circuit or microprocessor. In one embodiment, the sensor 12 could be an accelerometer that sends an interrupt only when a certain threshold is met. The threshold could be set mechanically, electrically, or in software. The software if employed may include a least square fit function to allow for overall normalization.

Although three device functions are presented in this embodiment, it will be appreciated that the invention may be applied to any number of device functions, including only a single function, such as illuminating a backlight, or a large number of different functions having different corresponding motion sequences. Where the function is backlight illumination, the function can include illuminating a display and/or illuminating keys or buttons on the device.

Figure 2:
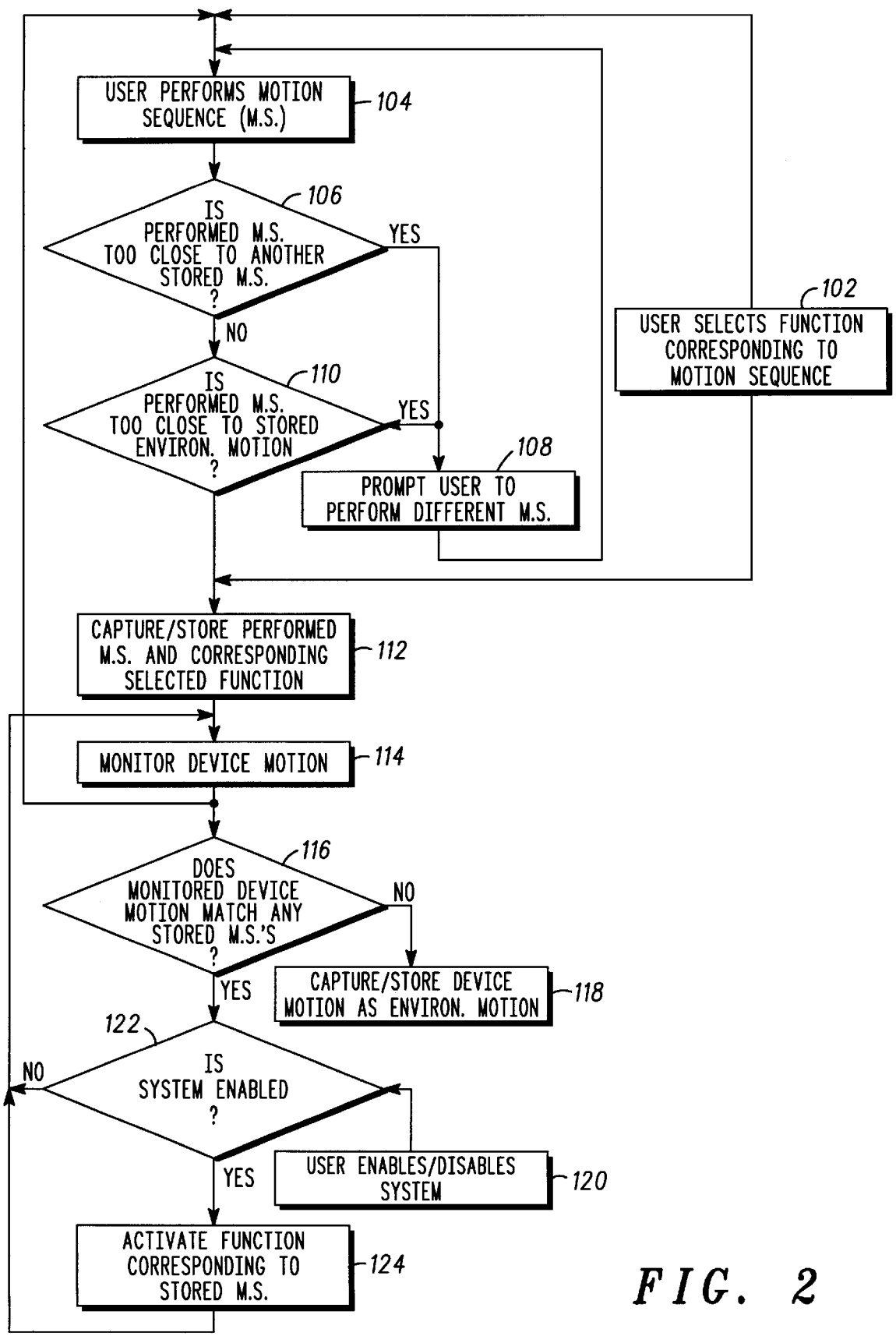
FIG. 2 is a flowchart illustrating a method for motion activated control of an electronic device according to a preferred embodiment of the present invention.

Referring now to FIG. 2, a preferred method embodiment according to the invention is depicted. Steps 102 and 104 relate to Steps by which the electronic device can be "taught" a motion sequence that will correspond to a desired function of the electronic device. In Step 102, the user selects a function corresponding to the motion sequence about to be taught. This can be done via the user interface 14 in FIG. 1. For example, the selected function may be activating a backlight.

In Step 104, the user performs a motion sequence that is desired to correspond to the selected function by physically manipulating the electronic device 10. For example, a motion sequence may include to shake the electronic device a certain number of times. In a variation, instead of performing a motion sequence, the user may select via the user interface 14 one from a set of pre-programmed motion sequences.

In Step 106, the motion processor 16 determines whether the performed motion sequence being taught is too close to another motion sequence already stored in the motion processor 16. If the performed motion sequence is too close to, or a duplicate of, a previously stored motion sequence, the motion processor 16 prompts the user at Step 108 to perform a different motion sequence. The prompt can be made via the user interface 14, or in the alternative, the device may prompt the user to reassign the motion sequence and if so done, the process moves to step 114 (not shown).

If the preferred motion sequence is not too close to a stored sequence, the motion processor 16 at Step 110 determines whether the performed motion sequence is too close to stored environmental motions. The environmental motions may be pre-programmed or may be learned by the motion processor 16 and stored. For example, the motion processor 16 can generate a motion signal based on the motion sequence and compare the motion signal to a stored threshold value. If the motion processor 16 determines that the performed motion sequence is too close to stored environmental motion, the motion processor 16 prompts the user to perform a different motion sequence at Step 108. This prompt can also be made via the user interface 14.

If the performed motion sequence is not too close to stored environmental motion, the motion processor 16 advances to Step 112. At Step 112, the motion processor 16 captures and stores the performed motion sequence and its corresponding selected function that was selected via the user interface 14.

Steps 102, 104, 106, 108 and 110 as described above can be made optional or not provided at all in some embodiments of the invention. For example, an apparatus and method according to the invention may begin at Step 112. That is, the motion processor 16 may be pre-programmed with one or more motion sequences and/or corresponding functions. For example, the pre-programmed function may be to activate a backlight if proper predetermined within sequence is detected. Alternatively, for example, Steps 102 and 104 may be present, but Steps 106, 108 and 110 may be eliminated.

Step 114 monitors the motion of the electronic device 10, for example, the motion sensor 12. At Step 116, the monitored device motion is compared by the motion processor 16 to determine whether it matches any stored motioned sequences. If the motion processor 16 at Step 116 determines that the monitored device motion does not match any stored motion signals, then in an optional feature at Step 118, the motion processor can capture and store the device motion as environmental motion. This captured and stored environmental motion data can then be used in Step 106 to set threshold levels for teaching new motion sequences.

In some embodiments, the user may enable or disable the system shown at Step 120. At Step 122, the motion processor 16 or device controller 18 responds to whether the system has been enabled or disabled, and if the system is disabled Step 124 is not performed. Although Step 122 is illustrated as occurring after Step 116, the enable/disable feature may occur anywhere before Step 124.

If the monitored device motion does match a stored motion sequence, then if the system is enabled, at Step 124 the motion processor 16 instructs the device controller 18 to activate the corresponding one of the device functions 20, 22 or 24. The motion processor 16 may send an interrupt to the device controller 10 when a predetermined motion sequence is detected. Step 124 is performed with reference to the motion signals and corresponding functions stored in the motion processor at Step 112.

It will appreciated that Steps 118, 120, and 122 are optional. For example, where a motion pattern, such as a series of three shakes in succession, is pre-programmed into the motion processor 16, Step 112 simply involves storing this pre-programmed information. The motion of the device 10 is then monitored at Step 114 by the motion sensor 12, and the motion processor 16 compares the monitored device motion with the stored three shake motion pattern at Step 124. If the three shakes are detected, motion processor 16 would instruct the device controller 18 to activate device function 20, such as illuminating the backlight for a period of time, at Step 124. Optionally, the pre-programmed motion sequence can act as a toggle so that each occurrence of the motion sequence turns the feature such as the backlight on or off.

While illumination of a backlight has been described as an example of one device function to be activated by the invention, the invention is applicable to any function of any electronic device. For example, the activated device function may call a certain telephone number, change a mode of the device, or change the volume of the device. The invention is also suitable for interacting with the display of the device. For example, where the device is displaying a menu or selectable sequence of characters, performing the motion sequence can scroll through the menu or characters and another motion can be used to select the displayed menu item or character.

Although three shakes in succession has been given as an example of a motion sequence, the motion sequences can be of any type detected by motion transducers and processors. Where multidirectional sensors are used, motion in one direction can be distinguished from motion in the other direction. Thus, for a three-axis motion sensing device, three shakes in one direction can be distinguished from three shakes in another direction. Further, a series of motions having a different time interval between the motions can be recognized as different motion sequences. For example, a frequency of shaking the device 10 three times a second (3 hz) can be used as a motion sequence with a threshold so that motions which occur at a much faster or slower rate will not activate the device function. Motions of a different frequency (and/or different direction) can activate a different device function.

Although the preferred embodiment is illustrated having the motion sensor 12, the user interface 14, and the motion processor 16 incorporated within the electronic device 10, any one or all three of these elements may be provided in a separate device, with appropriate communication between these elements and the device controller 18. For example, the motion sensor 12 may be provided as a separate external element which communicates via a corded, infrared, radio frequency, or other communication type with the motion processor 16 embodied in the electronic device. In another example, the motion sensor 12 and the motion processor 16 may be separate from the rest of the electronic device 10.

The invention has been described in detail with respect to preferred embodiments, and it will now be apparent from the foregoing to those skilled in the art that changes and modifications can be made without departing from the invention in its broader aspects. Therefore, the invention, as defined by the appended claims, is intended to cover all such changes and modifications as fall within the true spirit of the invention.

What is claimed is:

1. A method for activating a function of an electronic device, comprising the steps of:
    storing a first motion sequence and a first function corresponding to that first motion sequence;
    storing a second motion sequence and a second function corresponding to that second motion sequence, the second function being substantially different from the first function;
    monitoring motion of the electronic device;
    determining when the monitored motion corresponds to the first motion sequence;
    activating the function that corresponds to the first motion sequence when it is determined that the monitored motion corresponds to the first motion sequence;
    selecting the second function via a user interface; and
    designating a motion sequence to correspond to the second function.

2. The method according to claim 1, wherein the function is activation of a backlight of the electronic device and the activating step comprises activating the backlight.

3. The method according to claim 1, further comprising:
    moving the device in a motion sequence performed by the user to provide a performed motion sequence; and
    detecting and storing the performed motion sequence.

4. The method according to claim 3, further comprising determining whether the performed motion sequence differs from an already stored motion sequence by less than a predetermined amount.

5. The method according to claim 4, further comprising determining whether the performed motion sequence differs from ambient sequences related to normal operational use of the device.

6. The method according to claim 5, wherein the ambient sequences are store based on motion monitored.

7. The method according to claim 1, further comprising selectively enabling/disabling the performance of the activating step.

8. An apparatus for activating a function of an electronic device, comprising:
    a motion transducer that senses motion of the electronic device;
    a memory that stores a first motion sequence and a corresponding first function of the electronic device and a second motion sequence and a corresponding second function of the electronic device, wherein the second function is substantially different from the first function;
    a processor configured to determine when a stored motion sequence has been sensed by the motion transducer;
    a device controller in communication with the motion processor that activates the corresponding function when a motion processor determines that the stored motion sequence has been sensed by the motion transducer; and
    a user interface in communication with the memory of the motion processor for the user to select a stored motion sequence to correspond to a function of the electronic device.

9. An apparatus according to claim 8, wherein the function activated is illumination of a backlight of the electronic device.

10. An apparatus according to claim 8, wherein the motion transducer comprises an accelerometer.

11. An apparatus according to claim 8, wherein the motion transducer comprises a gyroscope.

12. An apparatus according to claim 8, wherein the motion transducer comprises an attitude sensor.

13. An apparatus according to claim 8, wherein the motion transducer and motion processor are contained in the electronic device.

14. An apparatus according to claim 8, wherein the motion transducer is remote from the electronic device.

15. An apparatus according to claim 8, wherein the motion processor is integrate with the device controller.

16. An apparatus according to claim 9, wherein the processor has a mode in which it stores motion sequences performed by the user.

17. An apparatus according to claim 16, wherein the processor determines whether a performed motion sequence differs from an already stored motion sequence by less than a predetermined amount.

18. An apparatus according to claim 17, wherein the processor stores ambient sequences related to normal operational use of the device and determines whether the performed motion sequence differs from the stored environmental motion sequences by less than a predetermined amount.

19. An apparatus according to claim 4, further comprising a disable device to disable the activation of a corresponding function.

* * * * *

UNITED STATES PATENT AND TRADEMARK OFFICE
CERTIFICATE OF CORRECTION

PATENT NO.   : 6,529,144 B1
DATED        : March 4, 2003
INVENTOR(S)  : Nilsen, Robert W. et al.

It is certified that error appears in the above-identified patent and that said Letters Patent is hereby corrected as shown below:

Column 6,
Line 6, change "store" to -- stored --
Line 46, change "integrate" to -- integrated --

Signed and Sealed this

Twenty-second Day of July, 2003

JAMES E. ROGAN
*Director of the United States Patent and Trademark Office*